United States Patent [19]
Peters

[11] Patent Number: 5,510,980
[45] Date of Patent: Apr. 23, 1996

[54] METHOD AND SYSTEM FOR SELECTING AND EXECUTING ARITHMETIC FUNCTIONS AND THE LIKE

[75] Inventor: Chris Peters, Bellevue, Wash.

[73] Assignee: Microsoft Corporation, Redmond, Wash.

[21] Appl. No.: 266,799

[22] Filed: Jun. 27, 1994

Related U.S. Application Data

[63] Continuation of Ser. No. 800,589, Nov. 27, 1991, abandoned.

[51] Int. Cl.⁶ .................................................. G06F 159/00
[52] U.S. Cl. .................................................................. 364/406
[58] Field of Search ............................. 364/419.1, 401, 364/406; 395/13, 51, 148, 155, 157, 161

[56] References Cited

U.S. PATENT DOCUMENTS

| | | | |
|---|---|---|---|
| 5,021,973 | 6/1991 | Hernandez et al. | 340/709 |
| 5,033,009 | 7/1991 | Dubnoff | 395/148 |
| 5,040,131 | 8/1991 | Torres | 395/156 |
| 5,055,998 | 10/1991 | Wright et al. | 364/DIG. 1 |
| 5,095,429 | 3/1992 | Harris et al. | 364/408 |
| 5,241,620 | 8/1993 | Ruggiero | 395/22 |
| 5,272,628 | 12/1993 | Koss | 364/419.19 |
| 5,276,607 | 1/1994 | Harris et al. | 364/401 |
| 5,339,410 | 8/1994 | Kanai | 395/600 |

OTHER PUBLICATIONS

"In Excelsis" (Microsoft Corp's Excel 3.0 spreadsheet) PC User, Ziff—Davis Publishing Jan. 16, 1991 issue : n150 pp. 44–47.

*Primary Examiner*—Donald E. McElheny, Jr.
*Attorney, Agent, or Firm*—Seed and Berry

[57] ABSTRACT

The present invention provides a method and system for automating the range selection process involved with arithmetic functions. When the sum function is selected, the system searches the cells above and to the left of the active cell to determine which cells the user is most likely attempting to manipulate. The range of cells selected by the system is marked by a flashing, dashed, bold border line, and is subject to confirmation by the user. To reject the range of cells selected by the system, the user only has to select a new range. The system reduces the steps required to perform an arithmetic function.

31 Claims, 8 Drawing Sheets

| Employee Name | Hr. worked reg. | Overtime | Reg. Rate | O.T. Rate | Total Pay |
|---|---|---|---|---|---|
| EmployeeA | 40 | 10 | $5.50 | $8.25 | $302.50 |
| EmployeeB | 35 | 0 | $5.00 | $7.50 | $175.00 |
| EmployeeC | 40 | 0 | $5.50 | $8.25 | $220.00 |
| EmployeeD | 20 | 0 | $5.00 | $7.50 | $100.00 |
| EmployeeE | 40 | 5 | $6.00 | $9.00 | $285.00 |
| EmployeeF | 40 | 8 | $5.75 | $8.63 | $299.00 |
| EmployeeG | 37 | 0 | $5.50 | $8.25 | $203.50 |
| EmployeeH | 40 | 0 | $6.25 | $9.38 | $250.00 |
| Total Hours: | | | | | |
| Total Paid: | | | $1,638.50 | $196.50 | $1,835.00 |

5b

B2  =SUM(...)

| Employee Name | Hr. worked reg. | Overtime | Reg. Rate | O.T. Rate | Total Pay |
|---|---|---|---|---|---|
| EmployeeA | 40 | 10 | $5.50 | $8.25 | $302.50 |
| EmployeeB | 35 | 0 | $5.00 | $7.50 | $175.00 |
| EmployeeC | 40 | 0 | $5.50 | $8.25 | $220.00 |
| EmployeeD | 20 | 0 | $5.00 | $7.50 | $100.00 |
| EmployeeE | 40 | 5 | $6.00 | $9.00 | $285.00 |
| EmployeeF | 40 | 8 | $5.75 | $8.63 | $299.00 |
| EmployeeG | 37 | 0 | $5.50 | $8.25 | $203.50 |
| EmployeeH | 40 | 0 | $6.25 | $9.38 | $250.00 |
| Total Hours: | =SUM(B2:B10) | | | | |
| Total Paid: | | | $1,638.50 | $196.50 | $1,835.00 |

5c

B11  =SUM(B2:B10)

| Employee Name | Hr. worked reg. | Overtime | Reg. Rate | O.T. Rate | Total Pay |
|---|---|---|---|---|---|
| EmployeeA | 40 | 10 | $5.50 | $8.25 | $302.50 |
| EmployeeB | 35 | 0 | $5.00 | $7.50 | $175.00 |
| EmployeeC | 40 | 0 | $5.50 | $8.25 | $220.00 |
| EmployeeD | 20 | 0 | $5.00 | $7.50 | $100.00 |
| EmployeeE | 40 | 5 | $6.00 | $9.00 | $285.00 |
| EmployeeF | 40 | 8 | $5.75 | $8.63 | $299.00 |
| EmployeeG | 37 | 0 | $5.50 | $8.25 | $203.50 |
| EmployeeH | 40 | 0 | $6.25 | $9.38 | $250.00 |
| Total Hours: | 292 | | | | |
| Total Paid: | | | $1,638.50 | $196.50 | $1,835.00 |

Figure 6

METHOD AND SYSTEM FOR SELECTING AND EXECUTING ARITHMETIC FUNCTIONS AND THE LIKE

CROSS-REFERENCE TO RELATED APPLICATION

This application is a continuation of U.S. patent application Ser. No. 07/800,589, filed Nov. 27, 1991, now abandoned.

TECHNICAL FIELD

This invention relates generally to the selection and execution of arithmetic functions and the like in a computer program and specifically, in a preferred embodiment, to a method and system for implementing a sum function in an application program.

BACKGROUND OF THE INVENTION

A primary use of computers, especially personal computers, is information processing. There are a wide variety of application programs available that "computerize" information processing tasks that were previously performed manually. One such application program is Microsoft Excel, an accounting program for personal or business use. In application programs such as Microsoft Excel, a worksheet is the primary document used to store and manipulate data. One commonly used type of worksheet is a spreadsheet, which is a two dimensional rectangular grid of a finite number of columns and rows. The intersection of each column and row is a cell, the basic unit of a worksheet in which a user stores data. A user may move the screen cursor around the spreadsheet to select desired cells as the active cell.

Data contained in the worksheet may be manipulated by functions, which are special pre-written formulas that take a value or values, perform an operation, and return a value or values. Using functions simplifies and shortens formulas in worksheets, especially those that perform lengthy or complex calculations. Data contained in the spreadsheet is manipulated in part by functions, which are calculation tools that allow a user of a computer system to perform decision-making, action-taking, and value-returning operations. Functions work with arguments, which are the information that a function uses to produce a new value or perform an action. Typically, a function and its arguments are in one of two forms: FUNCTION (arg1, arg2, . . . , argN), where the arguments may be numbers or cell names; or FUNCTION (arg1: argN), where arg1 and argN represent a range of cells. An example is the sum function, which returns the sum of the arguments specified.

In the past, a user carried out mathematical operations (addition, subtraction, division, etc.) on spreadsheet data in a variety of different ways. First, the user could type the numbers or cell names to be manipulated along with the operators in a formula format, i.e., A1+A2+A3. Second, the user could type in a function name along with a list of numbers and/or cell names to be manipulated as arguments, i.e., SUM (A1,A2,A3). Third, the user could type in a function name with the range of cells to be manipulated as arguments, i.e., SUM(A1: A3). Fourth, the user could type in the function name, then use the keyboard arrows or mouse to mark a range of cells to be used as arguments. Fifth, the user could select a function from a list of functions, then use the keyboard arrows or mouse to mark a range of cells to be used as arguments. Finally, some systems allow a user to manipulate an entire column or row of data by typing a special symbol in the cell below or to the right of the data to be manipulated. The user must specify whether the row or the column of data is to be manipulated, and how much of the data is to be used in the calculation. Although some of these methods are somewhat of an improvement over earlier methods, each existing method requires significant user effort to select and execute the mathematical operation.

The sum function constitutes the majority of all mathematical operations used in a spreadsheet. When using the sum function, spreadsheet users invariably put sum formulas at the bottom of a column of data or to the right of a row of data. Nonetheless, existing systems require a user to manually specify which cells to add together, by either typing in the information or by using keyboard arrows or a mouse to mark the range. It would be desirable for an application program to have the capability to select and execute an arithmetic function or the like with minimal user effort.

SUMMARY OF THE INVENTION

It is an object of the present invention to provide an improved method and system for selecting and executing an arithmetic function or the like in a computer program.

It is another object of the invention to provide such an improved method and system which can efficiently manipulate numeric data in a computer program such as an electronic spreadsheet.

It is another object of the present invention to provide an improved function in which a plurality of cells are automatically designated as the arguments of the function, subject to acceptance or rejection by the user.

It is another object of the present invention to visually notify the user which plurality of cells were automatically designated as arguments of the sum function. These and other objects of the present invention, which will become more apparent as the invention is described more fully below, are obtained by providing an improved method and system for selecting and executing arithmetic functions. In a preferred embodiment, arguments for a sum function are automatically selected using preprogrammed criteria once the user selects the sum function. The automatically selected argument cells are preferably visually designated using a marquis display or the like and the user is prompted to confirm or override the automatic selection.

BRIEF DESCRIPTION OF THE DRAWING

FIGS. 5 and 6 illustrate the screen displays presented to the user by a preferred embodiment of the present invention.

DETAILED DESCRIPTION OF THE PREFERRED EMBODIMENT

The present invention provides a method and system for selecting, and executing arithmetic function and the like with reduced user effort. A preferred embodiment for automating a summation process includes automatically selecting the plurality of contiguous cells that would most likely be designated as the range of arguments for a sum function, based on the location of the user-selected cell where the results of the addition will be displayed.

The operation of the preferred embodiment described herein will be explained with reference to the overview flow diagram of FIG. 1 and the screen displays of FIGS. 5 and 6. The process begins in block 10 when a user activates the autosum process by selecting the autosum button 30. At this time, the active cell 32, where the results of the summation will be displayed, is already selected. The column and row of the active cell, also known as the coordinates of the active cell are input to the autosum process in block 9. In block 11, the process then examines the cells in the column above the active cell 34, and in the row to the left of the active cell 36, searching for predetermined criteria. Based on this examination, the system selects, if possible, a group of contiguous cells as proposed arguments for the sum function. The cell examination process is described in detail below.

In block 12 the system determines whether a group of cells was selected in block 11. If no cells were selected, the process moves to block 15 to await manual selection by the user, indicating which group of cells should be summed. As soon an the cells are manually selected, the arithmetic is completed and the results are displayed in block 16. If a cell or cells are selected in block 11, the process moves to block 13, where the selected range of cells is displayed in the worksheet bordered by a rotating dashed line 38. The rotating dashed line visually informs the user which range of cells the program has selected, allowing the user to verify the accuracy of the automatic selection.

The process then preferably moves to block 14, where the user is given the option of overriding the selection. The process waits for the user to either accept the selected plurality of cells or reject them by manually selecting a plurality of cells.

Figure 1:
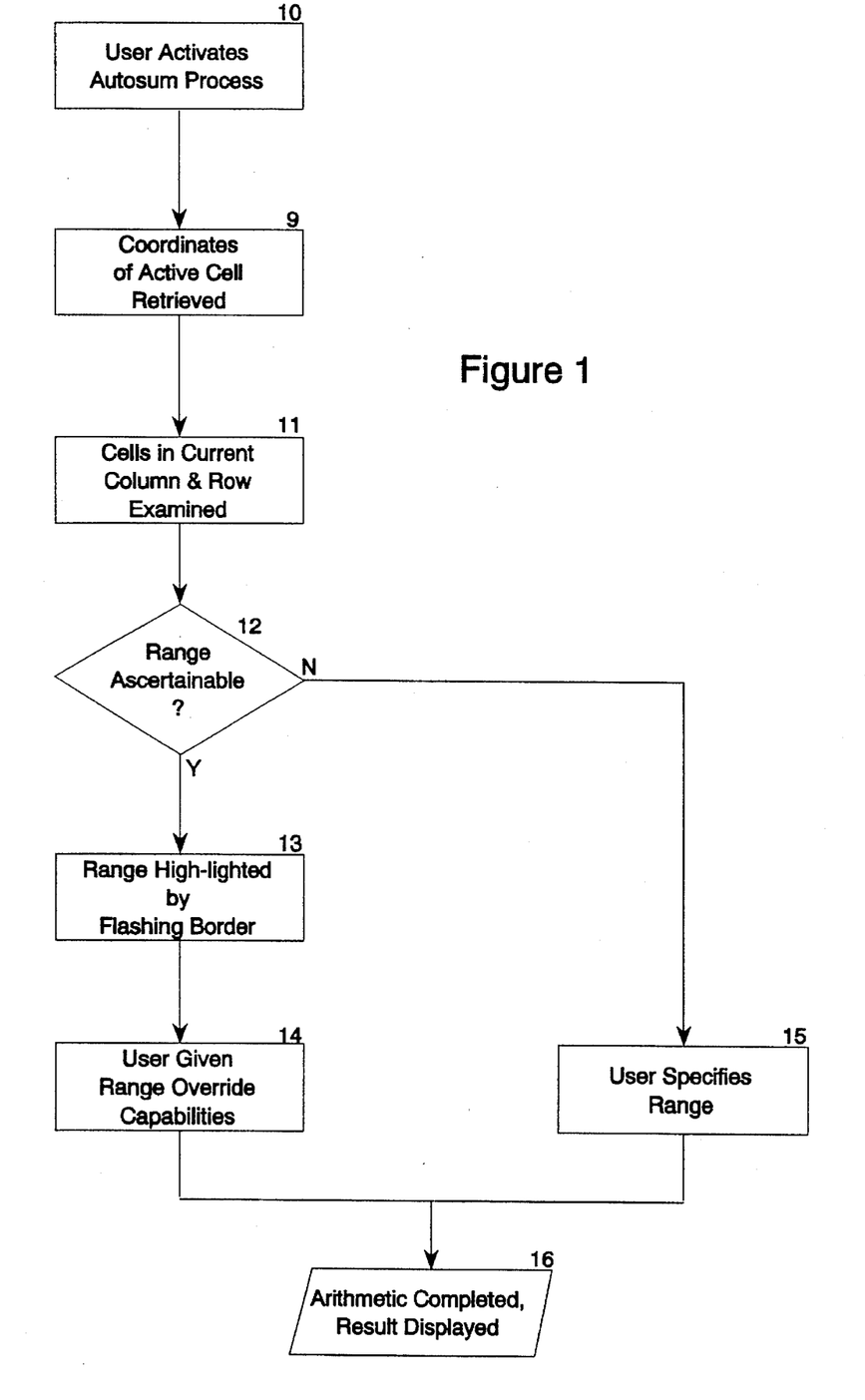
FIG. 1 is an overview flow diagram of an automated summation process that implements a preferred embodiment of the present invention.
Figure 2:
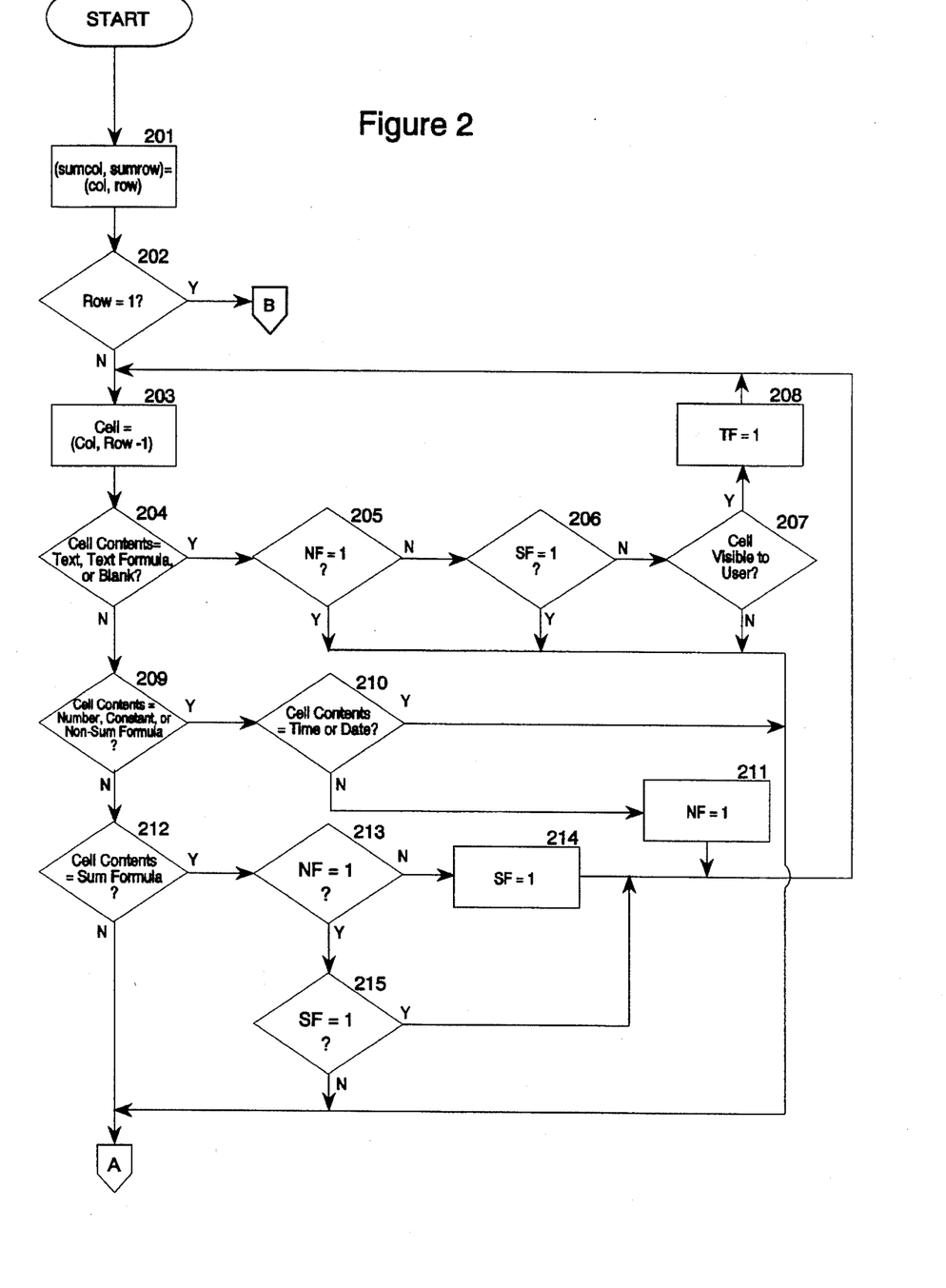
FIG. 2 is a detailed flow diagram of the method used in the preferred embodiment described herein to examine the cells above and in the same column as the cell where the sum result will be displayed.
Figure 2A:
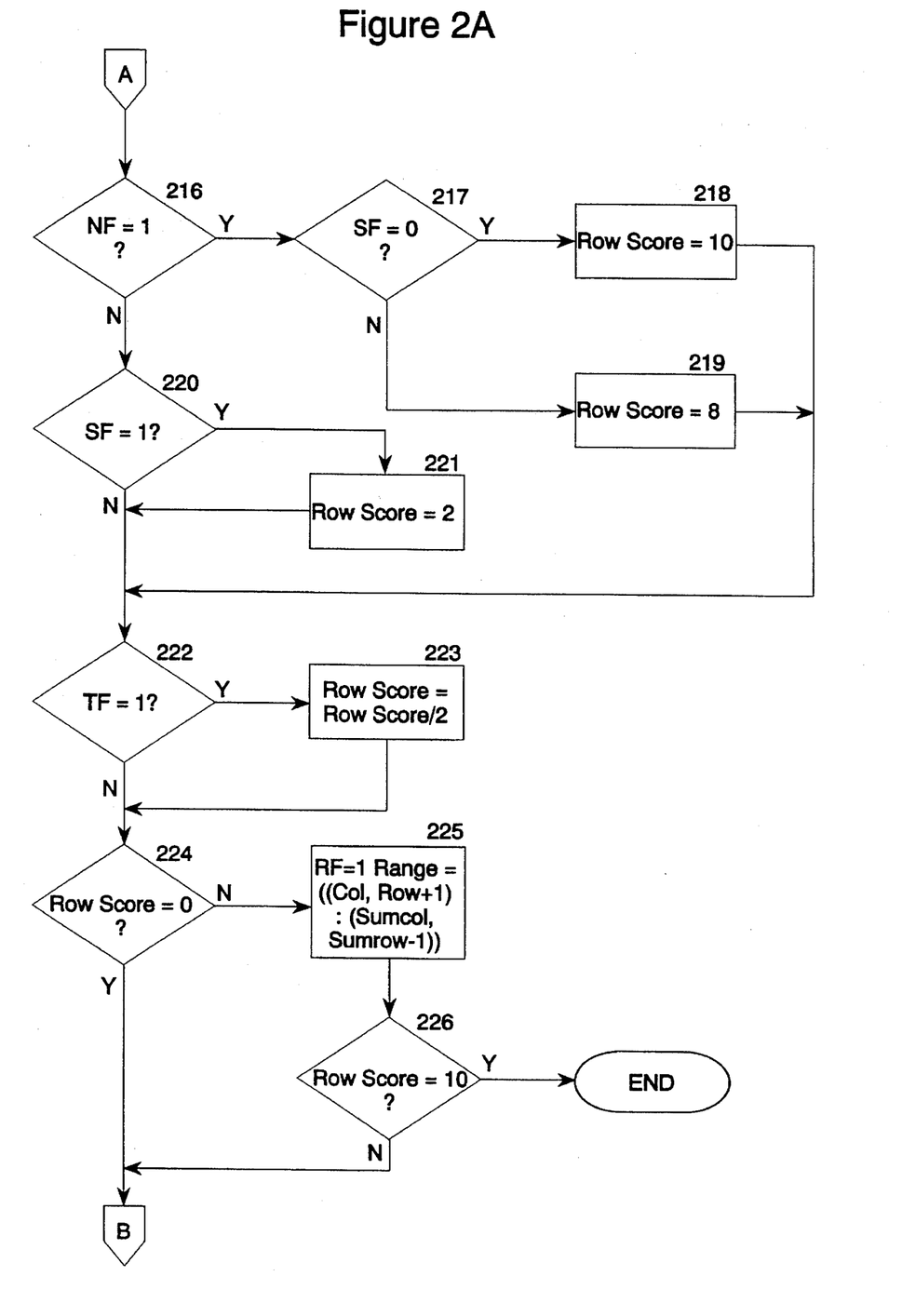
FIG. 2A is a detailed flow diagram of the method used in the preferred embodiment described herein to establish a row score.

FIGS. 2, 2A, 3, 3A, and 4 are detailed flow diagrams of the examination process used in the preferred embodiment described herein and referenced by FIG. 1, block 11. FIG. 2 illustrates the row examination section of the process, while FIG. 2A illustrates how the row score is established. In FIG. 2, the coordinates of the active cell, where the results of the addition will be displayed, are input to the examination process. The process searches the cells in the rows above, but in the same column as, the active cell for predetermined criteria. Based on the contents of these cells, a row score is determined. Based on the value of the row score, the process either makes a cell selection and exits the process, makes a cell selection and continues on to the column cell examination part of the process, or continues on to the column cell examination section of the process without making a cell selection.

In block 201, the process stores the coordinates of the active cell. These coordinates are where the results of the addition will be displayed. The active cell becomes the current cell being examined. In block 202, the process queries whether the active cell is in the top row. If so, the process concludes that a column of data is not being summed and the process skips to block 301, otherwise the process continues at block 203. In block 203, the process changes the coordinates of the current cell so that the new current cell is one row above and in the same column as the previous current cell.

In blocks 204 through 215, the contents of the current cell are examined. Based on the contents, the process either stays in a loop, each time through examining the cell above the last one, or it skips to block 216, where the row scoring computation begins.

In blocks 204 through 208, the process examines the current cell in search of text, a text formula, or a blank cell. The process remembers whether a cell containing one of these is encountered before or after a cell containing a number or a sum formula. If the process has already encountered a number or sum formula cell when it encounters a text cell, then the text cell is treated like a column heading and the examination process is over. If the process encounters a text cell before any number or sum formula cells, it keeps examining new cells in the same column until either a number, a sum formula, or the top of the column is encountered.

In block 204, the process queries whether the current cell is empty, contains text, or contains a text formula. If so, the process continues at block 205, where the process checks to see if a number has been encountered, else the process continues at block 209. The process would have remembered if a cell had previously been encountered during this search that contained a number or a nonsum formula. In block 205, if a number has been encountered the examination is over and the process skips to block 216, else the process continues at block 206. In block 206, the process queries whether a sum formula has been previously encountered. If so, the examination is over and the process skips to block 216, else the process continues at block 207. In block 207, the process queries whether the current cell is still visible to the user. If it is, the process remembers that text was found before numbers or sum formulas, and then loops back to block 203, where the coordinates of the current cell are changed. If the current cell is not still visible to the user, the top of the column has been reached, therefore the examination is over and the process skips to block 216.

In blocks 209 through 211, as long as numbers, or non-sum formulas are encountered, and they have not been designated a time or date, the process remembers that a number has been located and loops back to block 203 to change the coordinates of the current cell. If the cell contents are designated as a time or date, the examination is considered over because a time or date is usually is found at the top of a column. In block 209, the process examines the contents of the current cell to determine whether a number or a non-sum formula has been located. If so, the process continues at block 210, where the process queries whether the cell contents have been designated a time or date, else the process skips to block 212. If the cell contents have been designated as a time or date, the examination is over and the process skips to block 216, else the process remembers that a number was found then loops back to block 203.

In block 212, the process examines the contents of the current cell determine whether a sum formula has been located. If so, the process then determines in block 213 whether a number or non-sum formula has previously been encountered. If so, the process determines whether a sum formula, besides the one found in the current cell, has previously been encountered. If so, the process loops back to block 203 where the coordinates of the current cell are changed. If the current cell contains a sum formula and a number or non-sun formula has not previously been encountered, the process remembers a sum formula was found and loops back to block 203. If the current cell contains a sum formula, and either a number or non-sum formula has previously been encountered, and a sum formula has not been previously encountered, the examination is over and the process continues on at block 216. If the current cell does not contain a sum formula, the examination is over and the process skips to block 216.

In blocks 216 through 223, the process determines the row score based on what was encountered during the cell examination process. If numbers or non-sum formulas were encountered during the examination, the row score is given the highest possible value. If a sum formula was encountered, the row score is given the second highest possible value. If only sum formulas and no numbers, constants, or non-sum formulas were encountered, the row score is given the second to lowest possible value. Finally, if text, text formulas, or blank cells were encountered before anything else, the row score is divided in half. In block 216, the process queries whether numbers, constants or non-sum formulas were encountered. If the process continues at block 217, where it queries whether sum formula was encountered, else the process skips to block 220. In block 217, if no sum formula was encountered, the process continues at block 218, where the row score is made equal to ten. If a sum formula was encountered, the process skips to block 219 and the row score is made equal to eight. With this scoring methodology, a plurality of cells containing only numbers receives the highest possible score, while a plurality of cells containing numbers and sum formulas receives the second highest scores.

From blocks 218 and 219, the process skips to block 224. If it is determined in block 216 that no numbers were encountered, the process skips to block 220. In block 220, the process continues on to block 221, where the row score is made equal to two. The process continues on to block 222, where it determines whether text, text formulas, or blanks were encountered before any numbers, constants or formulas. If so, the process continues on to block 223, where the row score is divided in half.

In blocks 224 through 226, the process determines whether the range selection should be based on the row examination, or whether a column examination should be performed before the range selection is made. In block 224, the process queries whether the value of the row score is equal to zero. If the row score is not equal to zero, the process continues at block 223, where the range selected flag is set to true, and the range is computed, else the process continues at block 301. In block 223, the range is computed based on the cell immediately below the last cell searched and the cell immediately above where the results of the addition are to be displayed. After the range is computed, the process continues at block 224, where the process queries whether the row score is equal to ten. If so, the process is terminated, else the process continues at block 301. If the row score is equal to ten, there is no need to perform a column search and compute the column score, because the column will be summed when the row score is greater than or equal to the column score.

Figure 3:
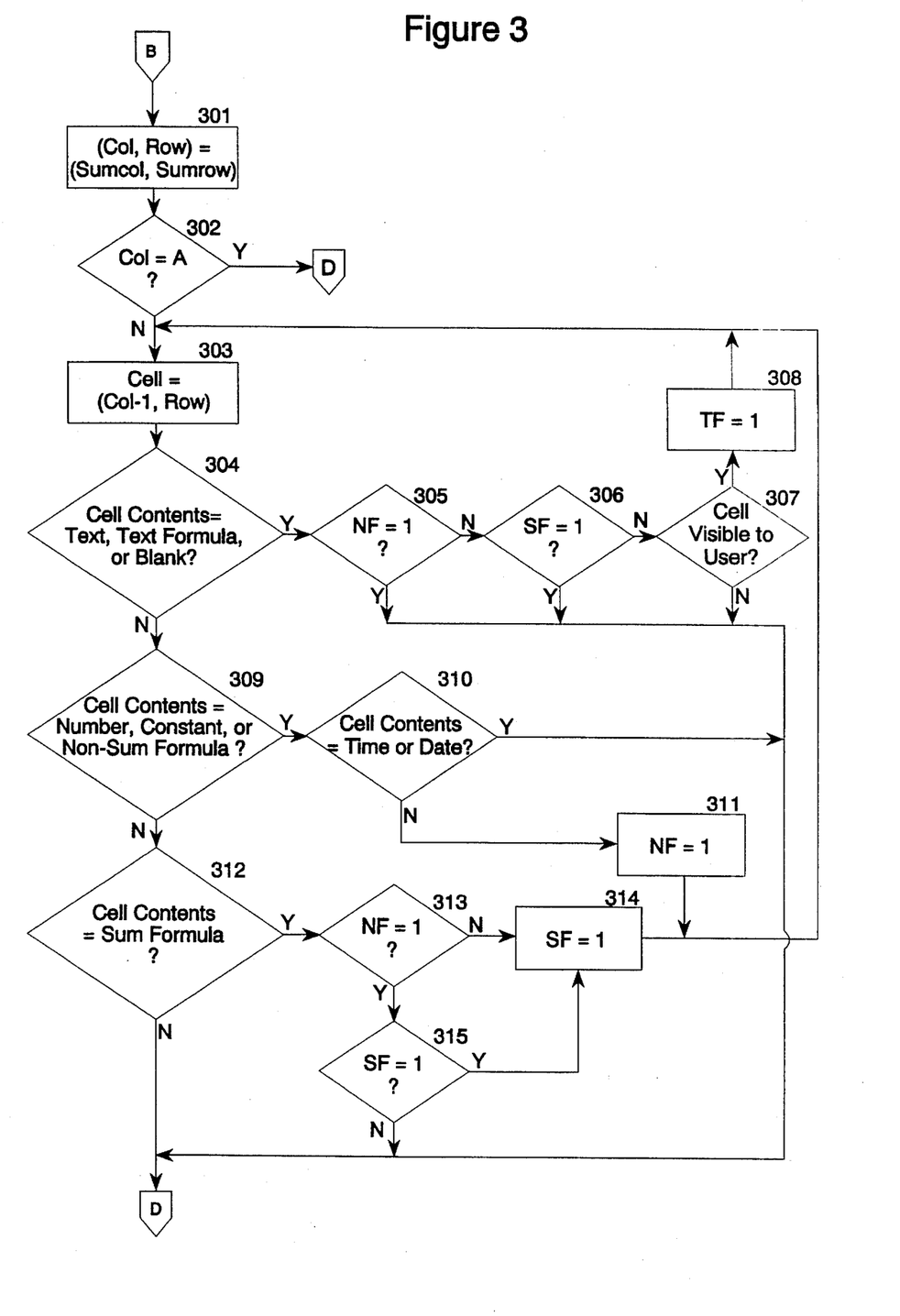
FIG. 3 is a detailed flow diagram of the method used in the preferred embodiment described herein to examine the cells to the left of and in the same row as the cell where the sum result will be displayed.
Figure 3A:
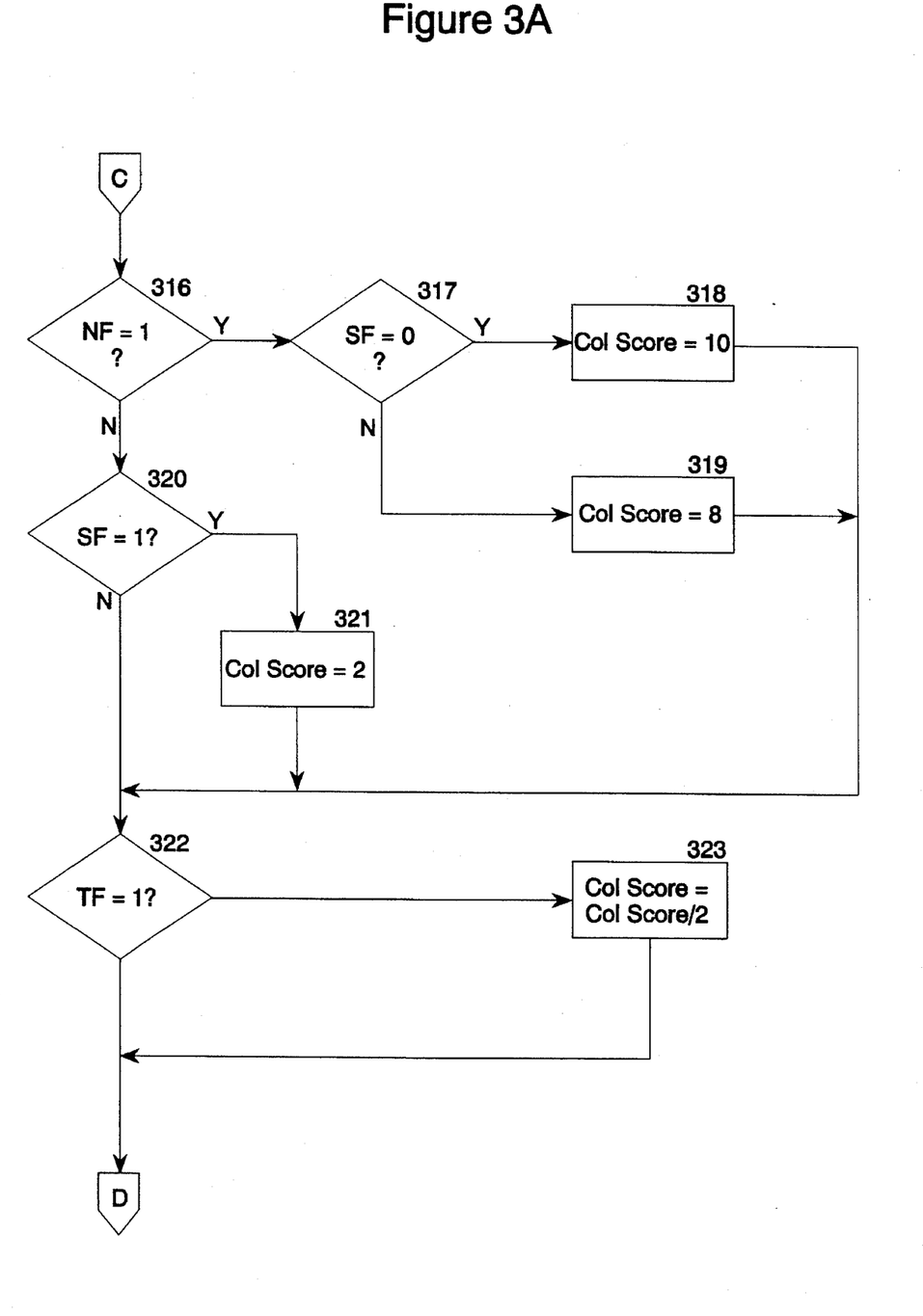
FIG. 3A is a detailed flow diagram of the method used in the preferred embodiment described herein to establish a column score.
Figure 4:
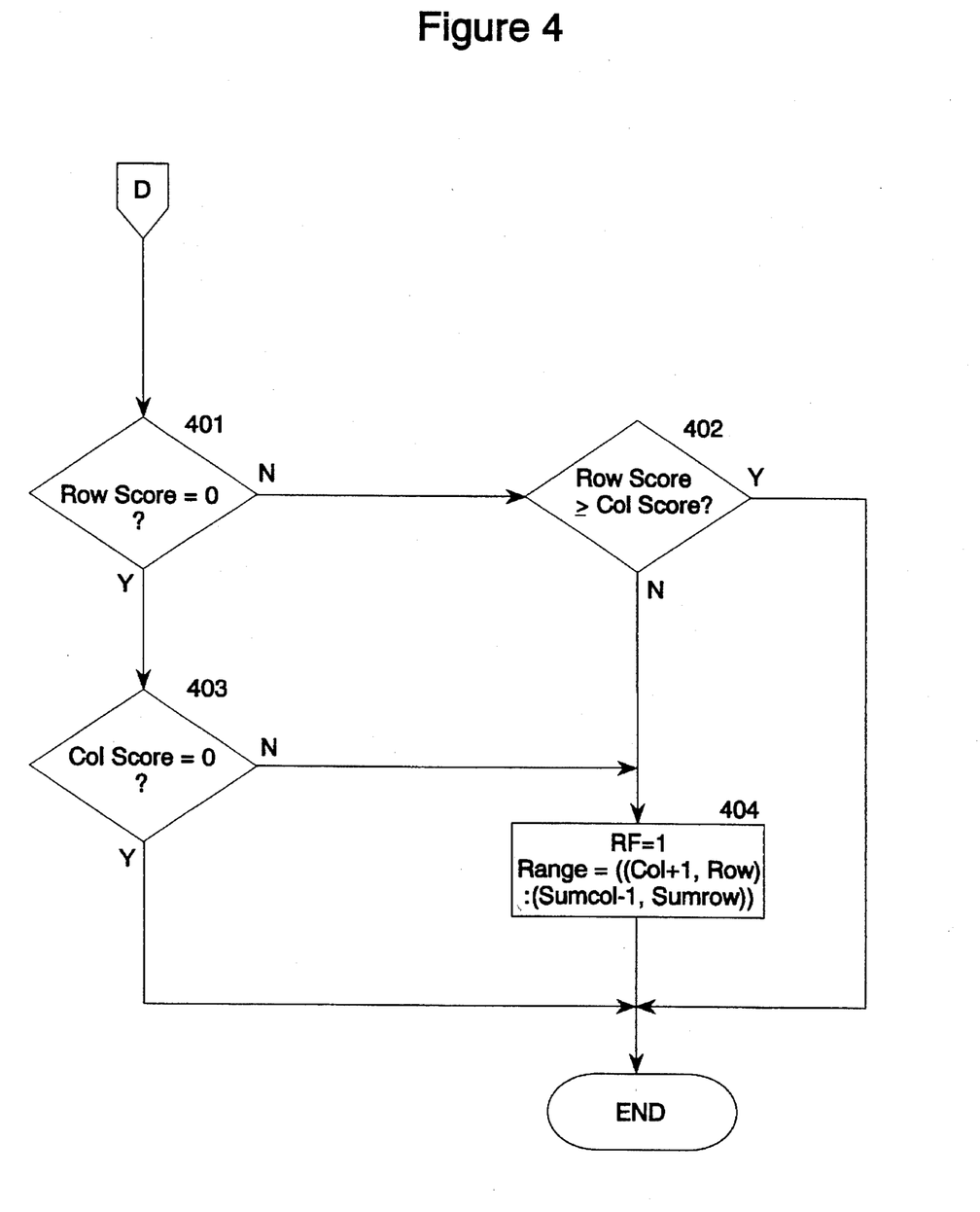
FIG. 4 is a detailed flow diagram of the method used in the preferred embodiment described herein to compare the row score to the column score to determine whether a row, column, or neither will be summed.

FIG. 3 is a detailed flow diagram of the column cell examination process. The coordinates of the cell where the results of the addition will be displayed are recalled to initialize the active cell. The process examines the columns to the left of, but in the same row as, the active cell for predetermined criteria. Based on the contents of these cells, a column score is determined in FIG. 3a. In FIG. 4, the process then compares the row and column scores and makes a determination, based on preselected standards, as to which contiguous cells, if any, will make up the range.

In block 301, the process makes the cell where the addition results will be displayed the current active cell. In block 302, the process queries whether the active cell is in the first column. If so, the search cannot continue to the left, therefore the process skips to block 332, else the process continues at block 303. In block 303, the process changes the coordinates of the current cell so that it is now to the left one column, but in the same row.

In blocks 304 through 313, the contents of the current cell are examined and remembered. Based on the contents, the process either stays in a loop, each time through examining the cell to the left of the last one, or it skips to block 314, where the column scoring computation begins.

In blocks 304 through 308, the process examines the current cell in search of text, a text formula, or a blank cell. The process remembers whether a cell containing one of these is encountered before or after a cell containing a number or a sum formula. If the process has already encountered a number or sum formula cell when it encounters a text cell, then the text cell is treated like a column heading and the search is over. If the process encounters a text cell before any number or sum formula cells, the process keeps searching new cells in the same column until either a number, a sum formula, or the top of the column is encountered.

In block 304, the process queries whether the current cell is empty contains text, or contains a text formula. If so, the process continues at block 305, where the process checks to see if a number has been encountered, else the process continues at block 309. The process remembers if a cell had previously been encountered during this search that contained a number or a non-sum formula. In block 305, if a number has been encountered, the examination is over and the process skips to block 316, else the process continues at block 306. In block 306, the process queries whether a sum formula has been previously encountered. If so, the examination is over and the process skips to block 316, else the process continues at block 307. In block 307, the process queries whether the current cell is still visible to the user. If it is, the process remembers that text was found before numbers or sum formulas, and then loops back to block 303, where the coordinates of the current cell are changed. If the current cell is not still visible to the user, the beginning of the row has been reached, therefore the examination is over and the process skips to block 316.

In blocks 309 through 311, as long as numbers or non-sum formulas are encountered, and they have not been designated a time or date, the process remembers that a number has been located and loops back to block 303 to change the coordinates of the current cell. In block 309, the process examines the contents of the current cell to determine whether a number or a non-sum formula has been located. If so, the process continues at block 310, where queries whether the cell contents have been designated a time or date, else the process skips to block 312. If the cell contents have been designated as a time or date, the search is over and the process skips to block 316, else the process remembers that a number was found in block 311 and then loops back to block 303.

In block 312, the process examines the contents of the current cell to determine whether a sum formula has been located. If so, the process then determines in block 313 whether a number or non-sum formula has previously been encountered. If so, the process determines whether a sum formula, besides the one found in the current cell, has previously been encountered. If so, the process loops back to block 303 where the coordinates of the current cell are changed. If the current cell contains a sum formula and a number or non-sum formula has not previously been encountered, the process remembers a sum formula was found and loops back to block 303. If the current cell contains a sum formula, and if either a number or non-sum formula has previously been encountered, and a sum formula has not been previously encountered, the examination is over and the process continues on at block 316. If the current cell does not contain a sum formula, the examination is over and the process skips to block 316.

In block 312, the process examines the contents of the current cell to determine whether a sum formula has been located. If so, the process continues at block 313, where it remembers that a sum formula was found, then the process loops back to block 303 where the coordinates of the current cell are changed. If no sum formula is located, the process continues at block 314.

In blocks 316 through 323, the process determines the column score based on what was encountered during the column cell examination process. If numbers or non-sum formulas were encountered during the examination, the column score is given the highest possible value. If a sum formula was encountered, the column score is given the second highest possible value. If only sum formulas and no numbers or non-sum formulas were encountered, the column score is given the second lowest possible value. Finally, if text, text formulas, or blank cells were encountered before anything else, the column score is divided in half. In block 316, the process queries whether numbers or non-sum formulas were encountered. If so, the process continues at block 317, where it queries whether a sum formula was encountered, else the process skips to block 320. In block 317, if no sum formula was encountered, the process continues at block 318, where the column score is made equal to ten. If a sum formula was encountered, the process skips to block 319 and the column score is made equal to eight. With this scoring methodology, a plurality of cells containing only numbers receives the highest possible score, while a plurality of cells containing numbers and sum formulas receives the second highest scores.

From blocks 318 and 319, the process skips to block 324. If it is determined in block 316 that no numbers were encountered, the process skips to block 320. In block 320, the process continues on to block 321, where the column score is made equal to two. The process continues on to block 322, where it determines whether text, text formulas, or blanks were encountered before any numbers or formulas. If so, the process continues on to block 323, where the column score is divided in half. In block 315, no sum formula was previously encountered, the process continues at block 316, where the column score is made equal to ten, else the column score is made equal to eight, and the process skips to block 322. In block 318, the process checks the status of the sum formula flag. If it is true, the process continues at block 319, where the column score is made equal to two, and the process continues at block 320, else the process skips to block 320. In block 320, the process checks the status of the text first flag. If it is true, the process continues at step 321, where the column score is divided by two and the process continues at block 322, else the process skips to block 322.

In FIG. 4, the process determines whether the cell selection should be based on the row cell examination or the column cell examination, or whether no range should be selected. In block 401, the process queries whether the value of the row score is equal to zero. If the row score is not equal to zero, the process continues at block 402, where it queries whether the row score is greater than or equal to the column score. If the row score is greater than or equal to the column score, the cells selected during the row examination are displayed to the user. If the row score is not equal to zero, the process skips to block 403, where it queries whether the column score is equal to zero. If both the row and column score are equal to zero, the process is unable to select a range of cells to add, therefore the process ends without setting the range selected flag to true. If the column score is not equal to zero or if the row score is not greater than or equal to the column score, the process continues at block 404. In block 404, the range selected flag is set to true, and the range is computed, based on the cell immediately to the right of the last cell searched and the cell immediately to the left of where the results of the addition are to be displayed. After the range is selected, the examination process ends.

Figure 6:
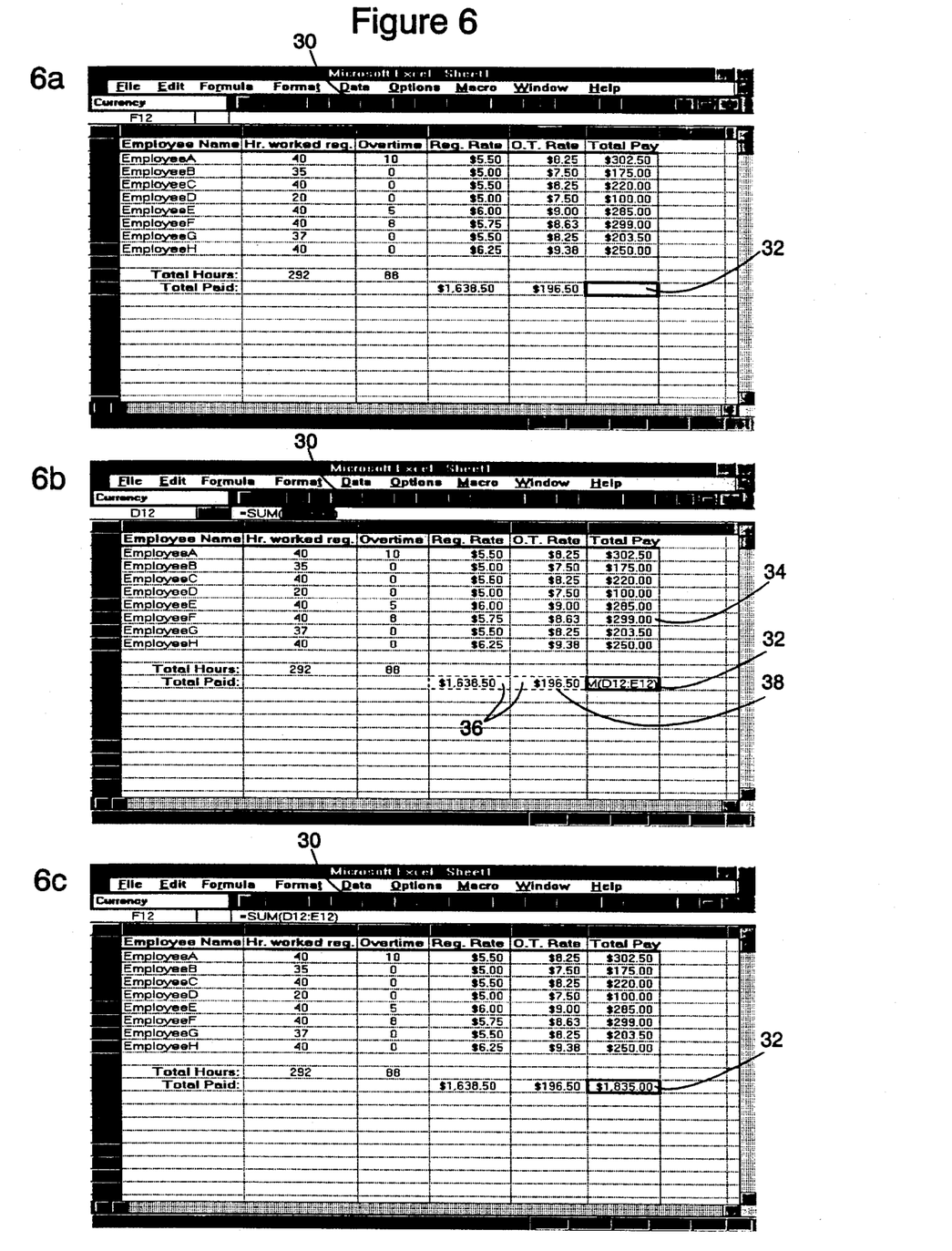

FIGS. 5 and 6 are screen prints of a spreadsheet implementing a preferred embodiment of the present invention. FIGS. 5a and 6a are screen prints taken immediately after the user has selected a cell where the results of the addition are to be displayed. FIGS. 5b and 6b are screen prints taken immediately after the user has selected the autosum function. A range of cells was automatically selected based on coordinates of the active cells, and is displayed as a plurality of contiguous cells bordered by a rotating, dashed, bold line. The inferred range and the sum function have been entered on the formula line and the system awaits confirmation or rejection by the user. FIGS. 5c and 6c are screen prints taken immediately after the user has confirmed the selection by pressing enter or by clicking on the enter box. The results of the addition are displayed.

Although the methods and systems of the present invention have been described in terms of preferred embodiments, it is not intended that the invention be limited to these embodiments. Modifications within the spirit of the invention will be apparent to those skilled in the art. It will be apparent to those skilled in the art that the present invention can be used in other than spreadsheet systems, and for other than sum formulas. The invention can be used generally in systems where arithmetic functions are performed on columns or rows of data. The scope of the present invention is defined by the claims that follow.

I claim:

1. A method, executed in a computer system, of implementing a sum function in an application program under the operation of a user during a user session, where the application program uses a worksheet to store and manipulate data, where the worksheet comprises a two dimensional grid of intersecting columns and rows, where the intersection of each column and row is a cell, where a cell may contain data, and where a plurality of cells is a contiguous range of cells in the same column or row, the method comprising the steps of:

(a) during a user session, choosing a cell within the worksheet where a sum result will be displayed, the chosen cell having a location in the worksheet, (b) during the user session, requesting execution of the sum function;

(c) in response to steps (a) and (b), the computer system automatically determining during the user session, which of a plurality of cells to select based upon the location of the chosen cell in the worksheet and without prior programming or input by a user to explicitly select the plurality of cells; and (d) responsive to the execution request, calculating the sum result of data associated with the determined plurality of cells and displaying the sum result in the chosen cell.

2. The method of claim 1 including:

(a) responsive to the automatic determination of a plurality of cells, visually notifying the user of the determined plurality of cells;

(b) responsive to the visual notification, providing user input accepting the determined plurality of cells; and (c) responsive to the user input signifying acceptance of the determined plurality of cells, performing the calculation of the sum result.

3. The method of claim 2 wherein the step of providing user input accepting the determined plurality of cells includes generating a signal.

4. The method of claim 2 wherein the step of visually notifying the user further includes displaying a border in a predefined format around the selected plurality of cells in the worksheet.

5. The method of claim 2 wherein the step of visually notifying the user further includes displaying a rotating, dashed, bold border line around the perimeter of the determined plurality of cells in the worksheet.

6. The method of claim 1 wherein the step of automatically determining a plurality of cells includes the additional steps of determining whether a column or a row of data is being summed and determining which plurality of cells in that column or row are being summed.

7. The method of claim 1 including:

(a) responsive to the automatic determination of a plurality of cells, visually notifying the user of the determined plurality of cells;

(b) responsive to the visual notification, providing user input rejecting the determined plurality of cells by selecting a new plurality of cells; and (c) responsive to the user input signifying rejection of the determined plurality of cells, performing the calculation of the sum result of data associated with the new plurality of cells.

8. A method, executed in a computer system, of implementing a sum function in an application program under the operation of a user, where the application program uses a worksheet to store and manipulate data, where the worksheet consists of a two dimensional grid of intersecting columns and row, where the intersection of each column and row is a cell, where a cell may contain data, and where a plurality of cells is a contiguous range of cells in the same column or row, the method comprising the steps of:

(a) choosing a cell within the worksheet where a sum result will be displayed, the chosen cell having a location in the worksheet;

(b) requesting execution of the sum function;

(c) in response to steps (a) and (b), the computer system automatically determining which of a plurality of cells to select based upon the location of the chosen cell in the worksheet and without input by a user to explicitly select the plurality of cells;

(d) responsive to the execution request, calculating the sum result of data associated with the determined plurality of cells and displaying the sum result in the chosen cell;

wherein the step of automatically determining a plurality to cells includes the additional steps of:

(e) examining the cells in the rows above and in the same column as the chosen cell, comparing the cell contents to predefined criteria, and establishing a row score;

(f) examining the cells in the columns to the left of and in the same row as the chosen cell, comparing the cell contents to predefined criteria, and establishing a column score; and (g) selecting a plurality of cells based on a comparison of the row score to the column score.

9. The method of claim 8 wherein the step of examining the cells in the rows above and in the same column as the chosen cell includes the additional steps of:

(a) initializing a current cell to be the chosen cell where the sum result will be entered;

(b) establishing a row score of zero when the current cell is in the top row of the worksheet; and (c) when the chosen cell is not in the top row of the worksheet, undertaking a cell examination process by selecting the cell immediately above the current cell to be the current cell and examining the current cell until predefined criteria have been met.

10. The method of claim 9 wherein the step of establishing the row score includes the additional steps of:

(a) setting the row score to a highest possible value when only numbers were encountered during the cell examination process;

(b) setting the row score to a second highest possible value when a mixture of numbers and sum formulas were encountered during the cell examination process;

(c) setting the row score to a third highest possible value when only sum formulas were encountered during the cell examination process;

(d) setting the row score to zero when no numbers or sum formulas were encountered during the cell examination process; and (e) dividing the row score in half when cells containing text, text formulas, or blanks were encountered during the cell examination process before any numbers or sum formulas.

11. The method of claim 9 wherein the step of determining a plurality of cells based on a comparison of the row score to the column score includes the additional steps of:

(a) when the row score is greater than or equal to the column score, selecting the next to the last cell encountered during the cell examination process as the first cell in the plurality of cells to be summed and the cell immediately above the chosen cell as the last cell in the plurality of cells to be summed; and (b) when the column score is greater than the row score, selecting the next to the last cell encountered during the cell examination process as the first cell in the plurality of cells to be summed and the cell immediately to the left of the chosen cell as the last cell in the plurality of cells to be summed.

12. The method of claim 8 wherein the step of examining the cells in the columns to the left of and in the same row as the chosen cell includes the additional steps of:

(a) initializing a current cell to be the chosen cell where the sum result will be entered;

(b) establishing a column score of zero if the chosen cell is in the first column of the worksheet; and (c) when the chosen cell is not in the first column of the worksheet, undertaking a cell examination process by selecting a cell immediately to the left of the current cell to be the current cell and examining the current cell until predefined criteria have been met.

13. The method of claim 12 wherein the step of establishing the column score includes the additional steps of:

(a) setting the column score to a highest possible value when only numbers were encountered during the cell examination process;

(b) setting the column score a second highest possible value when a mixture of numbers and sum formulas were encountered during the cell examination process;

(c) setting the column score to a third highest possible value when only sum formulas were encountered during the cell examination process;

(d) setting the column score to zero when no numbers or sum formulas were encountered during the cell examination process; and (e) dividing the column score in half when cells containing text, text formulas, or blanks were encountered during the cell examination process before any numbers or sum formulas.

14. The method of claims 9 or 12 wherein the cell examination process include the additional steps of:

(a) when the current cell contains text or a text formula, or it is blank, and when a cell that contains numbers or sum formulas has already been encountered, stopping the cell examination process;

(b) when the current cell contains text or a text formula, or it is blank, and when a cell that contains numbers or sum formulas has not been encountered, and when the current cell is still visible on the worksheet, remembering that text was found before numbers;

(c) when the current cell contains text or a text formula, or it is blank, and when a cell that contains numbers or sum formulas has not been encountered, and when the current cell is not visible on the worksheet, stopping the cell examination process;

(d) when the current cell contains a number or a formula that is not a sum formula and the current cell has been designated as containing a time or date, stopping the cell examination process;

(e) when the current cell contains a number or a formula that is not a sum formula and the current cell has not been designated as containing a time or date, remembering that a number was found;

(f) when the current cell contains a sum formula, remembering that a sum formula was found; and (g) when the current cell contains any value other than text, text formulas, blanks, numbers or formulas, stopping the cell examination process.

15. A method, executed in a computer system, of implementing a sum function in an application program under the operation of a user, where the application program uses a worksheet to store and manipulate data, where the worksheet consists of a two dimensional grid of intersecting columns and rows, where the intersection of each column and row is a cell, where a cell may contain data, and where a plurality of cells is a contiguous range of cells in the same column or row, the method comprising the steps of:

(a) choosing a cell within the worksheet where a sum result will be displayed, the chosen cell having a location in the worksheet;

(b) requesting execution of the sum function;

(c) in response to steps (a) and (b), the computer system automatically determining which of a plurality of cells to select based upon the location of the chosen cell in the worksheet and without input by a user to explicitly select the plurality of cells;

(d) responsive to the execution request, calculating the sum result of data associated with the determined plurality of cells and displaying the sum result in the chosen cell;

(e) examining the cells in the rows above and in the same column as the chosen cell, comparing the cell contents to predefined criteria, and establishing a row score;

(f) when the row score is equal to its highest possible value, setting the column score equal to zero;

(g) when the row score is less than its highest possible value, examining the cells in the columns to the left of and in the same row as the chosen cell, comparing the cell contents to predefined criteria, and establishing a column score; and (h) selecting a plurality of cells based on a comparison of the row score to the column score.

16. A computer system for summing data where the computer system runs an application program under the operation of a user during a user session, where the application program uses a worksheet to store and manipulate data, where the worksheet comprises a two dimensional grid of intersecting columns and rows, where the intersection of each column and row is a cell, where a cell contains data, and where a plurality of cells is a contiguous range of cells in the same column or row, comprising:

(a) means during a user session for choosing a cell within the worksheet where a sum result will be displayed, the chosen cell having a location in the worksheet;

(b) means during a user session for requesting execution of the sum function;

(c) means for automatically determining during the user session which of a plurality of cells to select based on the location of the chosen cell in the worksheet and without prior programming or input by a user to explicitly select the plurality of cells; and (d) means, responsive to the execution request, for calculating the sum result of data associated with the selected plurality of cells and displaying the sum result in the chosen cell.

17. The computer system of claim 16 wherein the means for automatically determining a plurality of cells additional comprises:

(a) means for visually notifying the user of the determined plurality of cells in response to the automatic determination of a plurality of cells;

(b) means for providing user input accepting the determined plurality of cells in response to the visual notification; and (c) means for calculating the sum of data associated with the determined plurality of cells and displaying the sum result in the chosen cell in response to user input signifying acceptance of the determined plurality of cells.

18. The computer system of claim 17 wherein the means for providing user input accepting the determined plurality of cells comprises means for generating a signal.

19. The computer system of claim 17 wherein the means for visually notifying the user further additionally comprises a means for displaying a border in a predefined format around the determined plurality of cells in the worksheet.

20. The computer system of claim 17 wherein the means for visually notifying the user further additionally comprises the means for displaying a rotating, dashed, bold border line around the perimeter of the determined plurality of cells in the worksheet.

21. The computer system of claim 16 wherein the means for automatically determining a plurality of cells additionally comprises means for determining whether a column or a row of data is being summed and for determining which plurality of cells in that column or row are being summed.

22. The computer system of claim 16 additionally comprising:
   (a) means for visually notifying the user of the determined plurality of cells responsive to the automatic determination of a plurality of cells;
   (b) means for providing user input rejecting the determined plurality of cells responsive to the visual notification; and
   (c) means for performing the calculation of the sum result responsive to the user input signifying rejection of the determined plurality of cells.

23. The compute system of claim 22 wherein the means for providing user input includes means for manually selecting a second plurality of cells to signify rejection of the determined plurality of cells.

24. A computer system for summing data where the computer system runs an application program under the operation of a user, where the application program uses a worksheet to store and manipulate data, where the worksheet consists of a two dimensional grid of intersecting columns and rows, where the intersection of each column and row is a cell, where a cell contains data, and where a plurality of cells is a contiguous range of cells in the same column or row, comprising:
   (a) means for choosing a cell within the worksheet where a sum result will be displayed, the chosen cell having a location in the worksheet;
   (b) means for requesting execution of the sum function;
   (c) means for automatically determining which of a plurality of cells to select based on the location of the chosen cell in the worksheet and without input by a user to explicitly select the plurality of cells;
   (d) means, responsive to the execution request, for calculating the sum result of data associated with the selected plurality of cells and displaying the sum result in the chosen cell;
   wherein the means for automatically determining a plurality of cells additionally comprises:
   (e) means for examining the cells in the rows above and in the same column as the chosen cell, comparing the cell contents to predefined criteria, and establishing a row score;
   (f) means for examining the cells in the columns to the left of and in the same row as the chosen cell, comparing the cell contents to predefined criteria, and establishing a column score; and
   (g) means for selecting a plurality of cells based on a comparison of the row score to the column score.

25. The computer system of claim 24 wherein the means for examining the cells in the rows above and in the same column as the chosen cell additionally comprises:
   (a) means for initializing a current cell to be the chosen cell where the sum result will be entered into;
   (b) means for establishing a row score of zero when the current cell is in the top row of the worksheet; and
   (c) means for undertaking a cell examination process by selecting the cell immediately above the current cell to be the current cell and examining the current cell until predefined criteria have been met, when the chosen cell is not in the top row of the worksheet.

26. The computer system of claim 25 wherein the means for establishing the row score additionally comprises:
   (a) means for setting the row score to a highest possible value when only numbers were encountered during the cell examination process;
   (b) means for setting the row score to a second highest possible value when a mixture of numbers and sum formulas were encountered during the cell examination process;
   (c) means for setting the row score to a third highest possible value when only sum formulas were encountered during the cell examination process;
   (d) means for setting the row score to zero when no numbers or sum formulas were encountered during the cell examination process; and
   (e) means for dividing the row score in half when cells containing text, text formulas, or blanks were encountered during the cell examination process before any numbers or sum formulas.

27. The computer system of claim 25 wherein the means for determining a plurality of cells based on a comparison of the row score to the column score additionally comprises:
   (a) means for selecting the next to the last cell encountered during the cell examination process as the first cell in the plurality of cells to be summed and the cell immediately above the chosen cell as the last cell in the plurality of cells to be summed, when the row score is greater than or equal to the column score; and
   (b) means for selecting the next to the last cell encountered during the cell examination process as the first cell in the plurality of cells to be summed and the cell immediately to the left of the chosen cell as the last cell in the plurality of cells to be summed, when the column score is greater than the row score.

28. The computer system of claim 24 wherein the means for examining the cells in the columns to the left of and in the same row as the chosen cell additionally comprises:
   (a) means for initializing a current cell to be the chosen cell where the sum result will be entered into;
   (b) means for establishing a column score of zero if the chosen cell is in the first column of the worksheet; and
   (c) means for undertaking a cell examination process by selecting a cell immediately to the left of the current cell to be the current cell and examining the current cell until predefined criteria have been met, when the chosen cell is not in the first column of the worksheet.

29. The computer system of claim 26 wherein the means for establishing the column score additionally comprises:
   (a) means for setting the column score to a highest possible value when only numbers were encountered during the cell examination process;
   (b) means for setting the column score a second highest possible value when a mixture of numbers and sum formulas were encountered during the cell examination process;
   (c) means for setting the column score to a third highest possible value when only sum formulas were encountered during the cell examination process;
   (d) means for setting the column score to zero when no numbers or sum formulas were encountered during the cell examination process; and (e) means for dividing the column score in half when cells containing text, text formulas, or blanks were encountered during the cell examination process before any numbers or sum formulas.

30. The computer system of claims 25 or 28 wherein the means for undertaking a cell examination process additionally comprises:

(a) means for stopping the cell examination process when the current cell contains text or a text formula, or it is blank, and when a cell that contains numbers or sum formulas has already been encountered;

(b) means for remembering that text was found before numbers when the current cell contains text or a text formula, or it is blank, and when a cell that contains numbers or sum formulas has not been encountered, and when the current cell is still visible on the worksheet;

(c) means for stopping the cell examination process when the current cell contains text or a text formula, or it is blank, and when a cell that contains numbers or sum formulas has not been encountered, and when the current cell is not visible on the worksheet;

(d) means for stopping the cell examination process when the current cell contains a number constant or a formula that is not a sum formula and the current cell has been designated as containing a time or date;

(e) means for remembering that a number was found when the current cell contains a number or a formula that is not a sum formula and the current cell has not been designated as containing a time or date;

(f) means for remembering that a sum formula was found when the current cell contains a sum formula; and (g) means for stopping the cell examination process when the current cell contains any value other than text, text formulas, blanks, numbers, or formulas.

31. A computer system for summing data where the computer system runs an application program under the operation of a user, where the application program uses a worksheet to store and manipulate data, where the worksheet consists of a two dimensional grid of intersecting columns and rows, where the intersection of each column and row is a cell, where a cell contains data, and where a plurality of cells is a contiguous range of cells in the same column or row, comprising:

(a) means for choosing a cell within the worksheet where a sum result will be displayed, the chosen cell having a location in the worksheet;

(b) means for requesting execution of the sum function;

(c) means for automatically determining which of a plurality of cells to select based on the location of the chosen cell in the worksheet and without input by a user to explicitly select the plurality of cells;

(d) means, responsive to the execution request, for calculating the sum result of data associated with the selected plurality of cells and displaying the sum result in the chosen cell;

wherein the means for automatically determining a plurality of cells additionally comprises:

(e) means for examining the cells in the rows above and in the same column as the chosen cell, comparing the cell contents to predefined criteria, and establishing a row score;

(f) means for setting the column score equal to zero when the row score is equal to its highest possible value;

(g) means for examining the cells in the columns to the left of and in the same row as the chosen cell, comparing the cell contents to predefined criteria, and establishing a column score when the row score is less than its highest possible value; and (h) means for selecting a plurality of cells based on a comparison of the row score to the column score.

* * * * *

UNITED STATES PATENT AND TRADEMARK OFFICE
CERTIFICATE OF CORRECTION

PATENT NO. : 5,510,980
DATED : April 23, 1996
INVENTOR(S) : Chris Peters

It is certified that error appears in the above-indentified patent and that said Letters Patent is hereby corrected as shown below:

In column 8, claim 1, line 65, please delete "," and insert therefor--;--.

In column 10, claim 8, line 4, please delete "to" and insert therefor--of--.

In column 12, claim 15, between lines 9 and 10, please insert--wherein the step of automatically determining a plurality of cells includes the additional steps of:--

In column 12, claim 17, line 47, please delete "additional" and insert therefor--additionally--.

In column 13, claim 23, line 22, please delete "compute" and insert therefor--computer--.

In column 14, claim 29, line 52, please delete "26" and insert therefor--28--.

Signed and Sealed this

Third Day of September, 1996

Attest:

BRUCE LEHMAN

*Attesting Officer*    *Commissioner of Patents and Trademarks*